United States Patent
Endler et al.

(10) Patent No.: US 9,892,196 B2
(45) Date of Patent: Feb. 13, 2018

(54) METHOD AND SYSTEM FOR ENTERING SEARCH QUERIES

(75) Inventors: Sean C. Endler, Santa Monica, CA (US); Lowell W. Goss, San Francisco, CA (US); Joseph S. Herres, Poulsbo, WA (US)

(73) Assignee: EXCALIBUR IP, LLC, New York, NY (US)

( * ) Notice: Subject to any disclaimer, the term of this patent is extended or adjusted under 35 U.S.C. 154(b) by 495 days.

(21) Appl. No.: 11/408,670

(22) Filed: Apr. 21, 2006

(65) Prior Publication Data
US 2007/0250511 A1   Oct. 25, 2007

(51) Int. Cl.
G06F 17/30   (2006.01)

(52) U.S. Cl.
CPC .............. *G06F 17/30864* (2013.01)

(58) Field of Classification Search
CPC ......... G06F 17/30047; G06F 17/30247; G06F 17/30253; G06F 17/30277; G06F 17/30389; G06F 17/30864; G06F 17/30964; G06F 17/30126; G06F 17/30398; G06F 17/30994; G06F 17/30637; G06F 17/3089; G06F 17/30
USPC ...... 707/3, 6, 104.1, 10, 102, 706, 722, 769, 707/915, 728, 736, 758
See application file for complete search history.

(56) References Cited

U.S. PATENT DOCUMENTS

| | | | | |
|---|---|---|---|---|
| 5,917,493 A | * | 6/1999 | Tan | G06F 1/1618 715/201 |
| 6,484,261 B1 | * | 11/2002 | Wiegel | H04L 41/0856 715/763 |
| 6,519,584 B1 | * | 2/2003 | Tognazzini | G06F 3/0481 707/706 |
| 7,028,253 B1 | * | 4/2006 | Lieberman | G06F 17/30265 707/999.004 |
| 7,137,127 B2 | * | 11/2006 | Slotznick | G06F 9/543 715/738 |
| 7,185,001 B1 | * | 2/2007 | Burdick | G06F 17/3064 707/999.003 |
| 7,457,825 B2 | * | 11/2008 | Li et al. | 707/999.104 |
| 7,716,157 B1 | * | 5/2010 | Bourdev | G06F 17/30256 382/118 |
| 7,844,594 B1 | * | 11/2010 | Holt | G06F 17/30719 707/706 |

(Continued)

OTHER PUBLICATIONS

Balkan, A. (Date Unknown). "Macromedia—Developer Center: Building an RSS Aggregator with Macromedia Firefly Components," located at <http://www/adobe.com/devnetiflash/articles/rss_aggregator.html> last visited on Mar. 2, 2007, 2 pages.

(Continued)

*Primary Examiner* — Ashish K Thomas
*Assistant Examiner* — Rezwanul Mahmood
(74) *Attorney, Agent, or Firm* — James J. DeCarlo; Greenberg Traurig, LLP

(57) ABSTRACT

Method and apparatus for entering search queries are disclosed. The method includes presenting a web page, wherein the web page includes at least a story and a thumbnail image associated with the story, dragging the thumbnail image to a search box on the web page, releasing the thumbnail image to the search box, and populating the search box with keywords associated with the thumbnail image.

20 Claims, 5 Drawing Sheets

(56) References Cited

U.S. PATENT DOCUMENTS

| | | | | |
|---|---|---|---|---|
| 7,873,622 B1* | 1/2011 | Karls | G06F 17/30864 707/707 |
| 8,170,343 B2* | 5/2012 | Chien | G06F 17/30247 382/157 |
| 2002/0112093 A1* | 8/2002 | Slotznick | G06F 9/543 719/329 |
| 2002/0178007 A1* | 11/2002 | Slotznick et al. | 704/270.1 |
| 2003/0034991 A1* | 2/2003 | Fitzsimons | G06F 17/3089 707/E17.116 |
| 2004/0015490 A1* | 1/2004 | Snyder | G06F 17/30864 707/999.003 |
| 2004/0054627 A1* | 3/2004 | Rutledge | G06Q 10/087 705/50 |
| 2004/0056883 A1* | 3/2004 | Wierowski | G06F 3/0482 715/719 |
| 2004/0071368 A1* | 4/2004 | Chadha | G06F 17/30244 707/E17.019 |
| 2004/0135815 A1* | 7/2004 | Browne | G06F 17/30274 707/E17.029 |
| 2004/0158346 A1* | 8/2004 | Dupuis | D05B 97/00 700/136 |
| 2004/0194034 A1* | 9/2004 | Vlamis | 715/530 |
| 2004/0205515 A1* | 10/2004 | Socolow | G06F 17/24 707/E17.001 |
| 2004/0249801 A1* | 12/2004 | Kapur | G06F 17/30864 707/999.003 |
| 2005/0052698 A1* | 3/2005 | Hirabayashi | 358/1.15 |
| 2005/0069849 A1* | 3/2005 | McKinney | G09B 17/00 434/178 |
| 2005/0120655 A1* | 6/2005 | Wolff | G06F 17/30056 707/E17.009 |
| 2005/0191608 A1* | 9/2005 | Ternouth | G09B 7/02 434/322 |
| 2005/0283741 A1* | 12/2005 | Balabanovic | G06F 17/30056 707/E17.009 |
| 2006/0004728 A1* | 1/2006 | Gotoh | G06F 17/30247 707/999.003 |
| 2006/0106764 A1* | 5/2006 | Girgensohn | G06F 17/30802 707/999.003 |
| 2006/0225094 A1* | 10/2006 | Facemire | G06F 3/0486 725/45 |
| 2006/0242663 A1* | 10/2006 | Gogerty | 725/34 |
| 2007/0028184 A1* | 2/2007 | Jang | G06F 3/04842 715/769 |
| 2007/0067290 A1* | 3/2007 | Makela | G06F 17/30041 707/999.006 |
| 2007/0094252 A1* | 4/2007 | Donnelly et al. | 707/5 |
| 2007/0136244 A1* | 6/2007 | MacLaurin | G06F 17/30964 707/999.003 |
| 2007/0172155 A1* | 7/2007 | Guckenberger | G06F 17/30247 707/999.006 |
| 2007/0186178 A1* | 8/2007 | Schiller | G06F 3/0486 707/E17.029 |
| 2007/0186189 A1* | 8/2007 | Schiller | G06F 17/30274 715/838 |
| 2007/0233678 A1* | 10/2007 | Bigelow | G06F 17/30274 707/999.006 |
| 2007/0244925 A1* | 10/2007 | Albouze | G06F 17/30265 707/999.107 |
| 2007/0250479 A1* | 10/2007 | Lunt et al. | 707/3 |
| 2007/0250492 A1* | 10/2007 | Angel | G06F 17/3097 707/999.004 |
| 2007/0250511 A1* | 10/2007 | Endler | G06F 17/30864 707/999.01 |
| 2007/0250791 A1* | 10/2007 | Halliday et al. | 715/808 |
| 2007/0260695 A1* | 11/2007 | Fenton | A63F 13/12 709/207 |
| 2007/0261071 A1* | 11/2007 | Lunt | G06Q 10/10 725/13 |
| 2007/0288432 A1* | 12/2007 | Weltman | G06F 17/30247 707/999.003 |
| 2008/0154869 A1* | 6/2008 | Leclercq | G06F 17/30973 707/999.004 |
| 2009/0037101 A1* | 2/2009 | Koike | G01C 21/3664 701/533 |
| 2012/0030195 A1* | 2/2012 | Holt | G06F 17/30719 707/722 |

OTHER PUBLICATIONS

Wikipedia, the Free Encyclopedia. (Date Unknown). "RSS," located at <http://en.wikipedia.org/wiki/RSS> last visited on Mar. 2, 2007, 11 pages.

\* cited by examiner

METHOD AND SYSTEM FOR ENTERING SEARCH QUERIES

FIELD OF THE INVENTION

The present invention relates to the field of Internet applications. In particular, the present invention relates to a method and system for entering search queries.

BACKGROUND OF THE INVENTION

In recent years, the Internet has been a main source of information for millions of users. These users rely on the Internet to receive their news, and to search for information of their interest. One conventional way for users to search for additional information after reading a news story or other information on a webpage is to conduct a search through a search box supported by a search engine. To do so, a user would have to determine what keywords to enter into the search box based on the understanding of the particular news story or information being read. In addition, the user would have to physically type the keywords in the search box. In other words, the conventional method puts the burden of determining the search queries on the user, such as analyzing the information and deriving relevant search queries from the information being viewed.

Therefore, there is a need to alleviate the user from analyzing and deriving search queries and there is a need to alleviate the user from physically typing the search terms.

SUMMARY

In one embodiment, a method for entering search queries includes presenting a web page, wherein the web page includes at least a story and a thumbnail image associated with the story, dragging the thumbnail image to a search box on the web page, releasing the thumbnail image to the search box, and populating the search box with keywords associated with the thumbnail image.

In another embodiment, an apparatus for entering search queries, where the apparatus includes logic operable on a computer server, includes logic for presenting a web page, wherein the web page includes at least a story and a thumbnail image associated with the story, logic for dragging the thumbnail image to a search box on the web page, logic for releasing the thumbnail image to the search box, and logic for populating the search box with keywords associated with the thumbnail image.

BRIEF DESCRIPTION OF THE DRAWINGS

The aforementioned features and advantages of the invention as well as additional features and advantages thereof will be more clearly understandable after reading detailed descriptions of embodiments of the invention in conjunction with the following drawings.

FIG. 4 illustrates a representation of the image object of FIG. 3 prior to release to a drop target according to an embodiment of the present invention.

FIG. 5 illustrates a representation of the image of FIG. 3 after being released to the drop target according to an embodiment of the present invention.

DESCRIPTION OF EMBODIMENTS

Methods and systems are provided for entering search queries. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1:
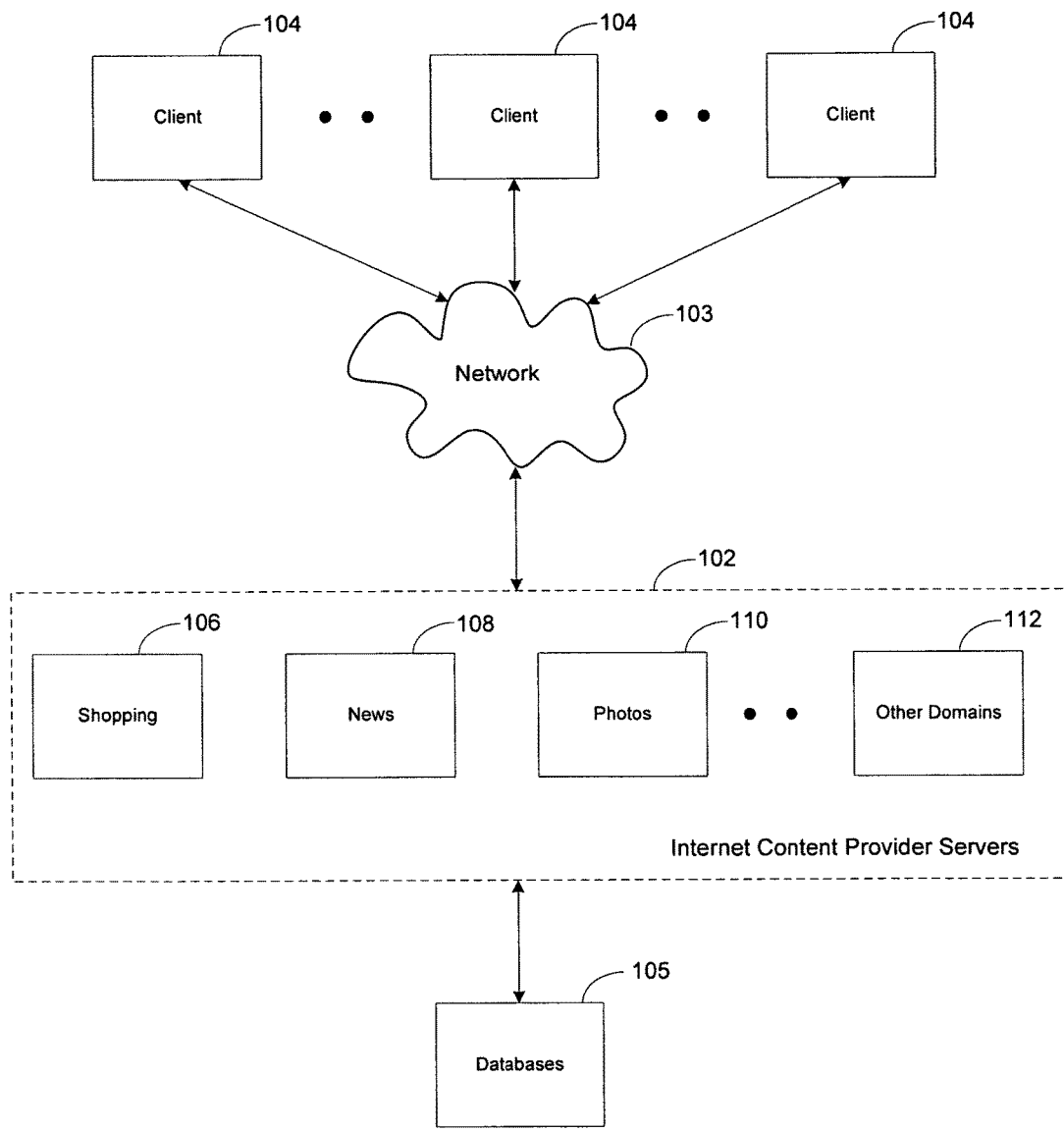
FIG. 1 illustrates a system for running news applications on a website according bodiment of the present invention.

FIG. 1 illustrates a system for running news applications on a website according to an embodiment of the present invention. The system includes one or more Internet content provider servers 102, databases 105, and one or more clients 104. The servers 102 interface with the clients 104 via a communication network 103. The Internet content provider servers 102 are host servers operable to provide content to clients 104 via the network 103. One or more of the servers host web sites and include the news and search functions. The databases 105 are operable to store data provided by the servers 102 and/or clients 104. The databases can communicate with the servers 102 or clients 104 via the network 103. The databases can store data items included in the web pages, such as news pages.

Alternatively, the servers 102 may include the databases, processors, switches, routers, interfaces, and other components and modules. Each of the servers 102 may comprise one or more servers, or may be combined into a lesser number of servers than shown, depending on computational and/or distributed computing requirements. The servers 102 may be located at different locations relative to each other. The databases may also be separately connected to the servers 102. There may be more or less than two databases, depending on computational and/or distributed computing requirements. The databases may be located at different locations relative to each other and the servers 102.

Each of the clients 104 may be a general purpose computer, such as a personal computer, having a central processing unit (CPU), a memory, an input device, and an output device. Other computer system configurations, including Internet appliances, hand-held devices, wireless devices, portable devices, wearable computers, cellular or mobile phones, portable digital assistants (PDAs), multiprocessor systems, microprocessor-based or programmable consumer electronics, set-top boxes, network PCs, minicomputers, and the like may also be implemented as the clients 104. Clients 104 include one or more applications, program modules, and/or sub-routines. As an example, clients 106 may include a browser application (e.g., Internet Explorer, etc.) and a graphical user interface (GUI) to access web sites and web pages provided by the servers 102 and data stored at the databases 105. Clients 104 may be remote from each other, the servers 102, and/or the databases.

The network 103 is a communications network, such as a local area network (LAN), a wide area network (WAN), or the Internet. When the network 103 is a public network, security features (e.g., VPN/SSL secure transport) may be included to ensure authorized access within the system.

The servers 102 further include a plurality of individual domains, for example, shopping domain 106, news domain 108, photos domain 110 and other domains 112. A domain is a computer system implemented with different hardware and software for a specific application, such as the shopping applications, news applications, and photo applications. The news applications of the present invention are run on the news domain 108. These applications implement Web 2.0 functionalities using a combination of HTML, CSS, JavaScript and "Asynchronous JavaScript and XML" (AJAX).

In particular, JavaScript is used to create, monitor, change objects and change the state of various image objects, in addition to keeping track of browser behavior changes initiated by the user. For example, when a user starts dragging an original thumbnail image in the browser window, the browser fires "mouse down" and "mouse move" events which are captured by the JavaScript and an object is created to handle the event. The object is effectively a copy of the original thumbnail image, and the copy of the image is being moved around. In other words, each object has states, and such states are created and modified in response to user initiated changes (events) to the browser behavior.

As described above, the process of monitoring and updating states of an object is event driven. When a user performs a specific action, JavaScript that runs in the background determines the exact browser event that has been initiated according to a set of user cases. For example, if the user clicks outside of an image and drags, that action is interpreted as the intent to draw a selection rectangle. Similarly, if the user clicks directly on an image and starts to move by a distance greater than five pixels, that action is interpreted as a drag. Then, the JavaScript starts to monitor the mouse movement and attaches the thumbnail images to the cursor at that point. While moving the cursor, the JavaScript updates the attached image's position and waits for the user to release the image. Upon the image being released, the JavaScript determines the location of the cursor within the browser window. If the image is dropped on the search box, the keywords associated with the image are appended to the list of keywords already exist in the search box. If the image is dropped on an invalid drop target, a reset action is initiated and the image is snapped back to its original location. While the user is dragging a thumbnail image, the JavaScript monitors where the cursor is, and determines whether it is over a valid drop target or an invalid drop target. In the case that the cursor is over a valid drop target, the JavaScript would cause the valid drop target to be highlighted, providing a positive feedback to the user. When the cursor moves out of the valid drop target, the JavaScript would deactivate the highlighted area.

Figure 2:
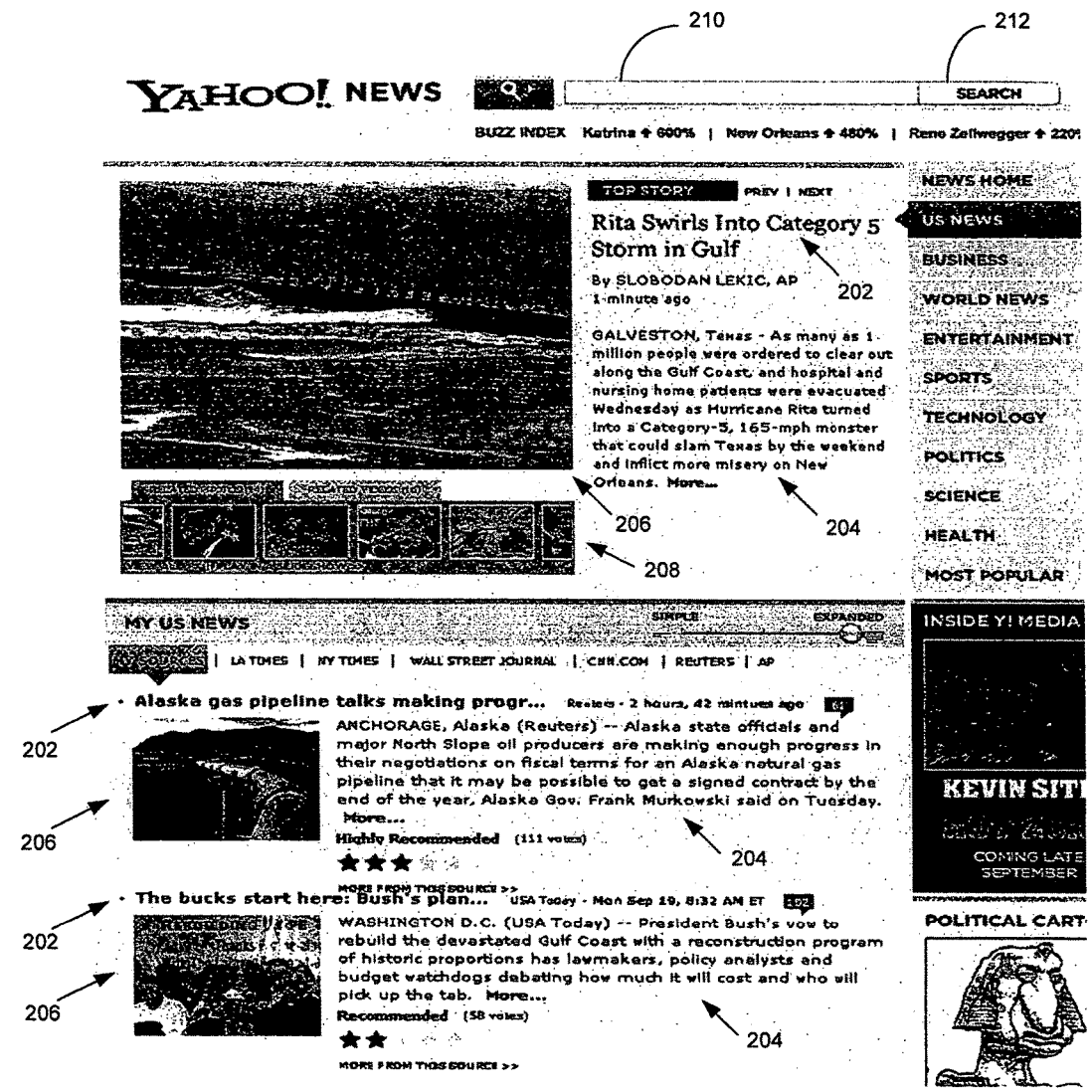
FIG. 2 illustrates a news page for applying the drag and drop search method according to an embodiment of the present invention.

FIG. 2 illustrates a news page for applying the drag and drop search method according to an embodiment of the present invention. As shown in the left column of FIG. 2, the news page includes a main story and a series of other stories.

Each story includes a headline 202, a textual summary 204, and an thumbnail image 206 (also referred to as an image object) of the story. The News page further includes a series of related photos and videos 208 of the main story. In addition, the News page also includes a search box 210 which users may enter one or more key words and then press the search button 212 to search for additional information related to their interest. In the right column, the news page includes various classifications of news, such as the US news, business, world news, entertainment, sports, technology, politics, science, health, and other topics of interest. After reading this news page, a user may be interested in a particular image object and may like to search for more information about the image object. The present disclosure enables a user to perform a drag-and-drop operation on an image object of interest to the search box.

Figure 3:
FIG. 3 illustrates a representation of an image object being dragged according to an embodiment of the present invention.

FIG. 3 illustrates a representation of an image object being dragged according to an embodiment of the present invention. In this example, the user is interested in the "Alaska gas pipeline talks" story and elects to drag the image object of this story to the search box for further search. As shown in FIG. 3, a copy of the image object 302 of this article is being dragged to the search box. In one implementation, keywords are assigned to the image object that describes the image and the association to the related article through the <keyword>tag. In this case, a set of keywords 304 are attached to the corresponding image object in transit, which include "pipeline", "Alaska", "North Slope", and "oil producers."

Note that a visual indicator, such as an icon, may be applied to a draggable image object to inform the user of the search capabilities (i.e. drag-and-drop functionalities) that may be applied to the image object. Once the image object 302 is being dragged, another visual indicator may be attached to the image object displaying the actual keywords 304 associated with that image, and while in the "dragging" state, yet another visual indicator, such as highlight color, may be assigned to the drop target(s) available to receive the dragged image object. In this example, the drop target is the search box 306.

FIG. 4 illustrates a representation of the image object of FIG. 3 prior to release to a drop target according to an embodiment of the present invention. In FIG. 4, the image object 402 and its corresponding keywords 404 are dragged to the top of the search box 406. The search box continues to be highlighted indicating it is a valid drop target. FIG. 5 illustrates a representation of the image of FIG. 3 after being released to the drop target according to an embodiment of the present invention. Upon release of the image object on the drop target, which is the search box 502 in this example, the associated keywords of the image object are auto-populated in the search box. Then the highlight color around the search box is removed. From the auto-populated list of keywords, the user may start a search based on these search terms. Alternatively, the user may edit the list of keywords and then initiate a search of the revised search terms in the search box.

Note that the search terms are auto-populated and the user is alleviated from having to physically type in the search terms. Therefore, from a user experience point of view, the disclosed method provides users the ability to search an image object that they are interested in. It also alleviates the user from determining what search terms that should go into the search box.

In one approach, the information in the news page is modeled after the Rich Site Summary (RSS) format. The following is an example of a news page in RSS format:

```
<topstories>
<source title="CNN.com">
<story>
    <title>U.S., Russia reject N Korea demand</title>
    <ogsource>CNN</ogsource>
    <age>12 minutes ago</age>
    <comments>32</comments>
    <thumburl>data/img/thumb27.jpg</thumburl>
    <description>UNITED NATIONS (CNN) -- U.S. Secretary of State Condoleezza Rice and
her Russian counterpart have rejected a North Korean statement that Pyongyang would
begin dismantling its nuclear program only if the United States provided a light-water
reactor for civilian power.</description>
    <rating>3</rating>
    <keywords>Condoleezza Rice, N Korea, Russia, Reject, Nuclear Program</keywords>
</story>
<story>
    <title>Commandos join Antarctic rescue mission</title>
    <ogsource>CNN</ogsource>
    <age>22 minutes ago</age>
    <comments>56</comments>
    <thumburl>data/img/thumb28.jpg</thumburl>
    <description>BUENOS AIRES, Argentina (CNN) -- Four army commandos on skis dropped
by helicopter Tuesday onto an Antarctic glacier to search for two Argentine men who
plunged into a deep ice crevasse in a weekend snowmobiling accident.</description>
    <rating>2</rating>
    <keywords>Commandos, Antarctic, Rescue, Crevasse, Snowmobiling
Accident</keywords>
</story>
<story>
    <title>Experts weigh environmental health risks</title>
    <ogsource>CNN</ogsource>
    <age>54 minutes ago</age>
    <comments>112</comments>
    <thumburl>data/img/thumb29.jpg</thumburl>
    <description>New Orleans, LO. (CNN) -- As the floodwater recedes in New Orleans,
scientists are testing it and the mud it leaves behind to answer a big question: Is the city on
its way to becoming safe to inhabit?</description>
    <rating>4</rating>
    <keywords>Floodwater, Health Risks, New Orleans, Scientists, Safe</keywords>
</story>
```

As shown above, each story is described within the <story> and </story> tags of the RSS data. In this example, the RSS format of the story further includes the following tags. In other embodiments, some of the tags may not be used and some other tags may be added.

<title>: describes the title of the story;

<ogsource>: describes the source of the news story, such as CNN;

<age>: describes when the news story was published, such as 12 minutes ago in the first story;

<comments>: indicates how many user comments were posted about this story;

<thumburl>: indicates the source (URL) location of the thumbnail image object, such as data/img/thumb27. jpg;

<description>: describes a summary or the full content of the story;

<rating>: indicates a rating of the story; and

<keywords>: describes a list of keywords related to the story.

When a user drags an image object, the application software examines the RSS data to determine where the thumbnail URL tag and the keyword tag. The thumbnail URL provides information for locating the image object resource. In the example above, the path to the corresponding image object thumb27.jpeg is located in a folder called img, which is in a folder called data.

In one implementation, the Macromedia Flash is used as platform of development. In particular, the RSS data feed is implemented as a Macromedia Flash Plug-In. RSS is a family of XML dialects for web syndication used by news websites and weblogs. The technology of RSS allows Internet users to subscribe to websites that have provided RSS feeds, which are typically websites that change or add content regularly. To use this technology, site owners create or obtain specialized software (such as a content management system) that, in the machine-readable XML format, presents new articles in a list, and provides a line or two of each article and a link to the full article.

The RSS formats provide web content or summaries of web content with links to the full versions of the content and other meta-data. This information is delivered as an XML file called an RSS feed, web-feed, RSS stream, or RSS channel. In addition to facilitating syndication, RSS allows a website's frequent readers to track updates on the site using an aggregator.

RSS may also be used by the weblog community to share the latest entries of headline news and their corresponding full text, and attached multimedia files to the news, such as podcasting, vodcasting, broadcasting, screencasting, Vlogging, and MP3 blogs. The use of RSS has been adopted by certain news organizations, including Reuters, CNN, and the BBC. These news providers allow other websites to incorporate their "syndicated" headlines or headlines and short summary feeds under various usage arrangements. RSS may also be used for other purposes, including any other activities that involve periodic updates or publications.

In one approach, a program known as a feed reader or aggregator can check RSS-enabled web pages on behalf of a user and display any updated articles that it finds. RSS feeds may be found on major and smaller websites, as well as on Blog sites.

Client-side readers and aggregators are typically constructed as standalone programs or extensions to existing programs like web browsers. Browsers are moving toward integrated feed reader functions, for example Opera and Mozilla Firefox. Such programs are available for various operating systems. Web-based feed readers and news aggregators require no software installation and make the user's feeds available on any computer with Web access. Some aggregators combine RSS feeds into new feeds, for example taking all football-related items from several sports feeds to provide a new football feed. There are also search engines for content published via RSS feeds like Feedster or Blogdigger. On web pages, RSS feeds are typically linked with the letters XML or RSS.

In another embodiment, multiple image objects may be dragged to the search box and their corresponding keywords are appended to form a query search string. The user may edit the query search string to add terms the user is interested in or remove terms the user is not interested in. Once the search box is auto-populated with keywords from the multiple image objects, the user may search the Internet for information about the image objects, and the search results are returned and presented on the web page. Note that the disclosed method may expand or create new tags in the RSS data that would be specific to the drag-and-drop search function. For example, a <keyword> tag that applies to the image only or <association> or <context> tag that relates the image object to the context of the story in which it is associated with.

Yet in another embodiment, the drag-and-drop function may be utilized in a photo album scenario where the album name may be auto-populated according to its contents. In addition, the photo album may be defined and auto-populated with image objects.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are to be seen as references to suitable means for providing the described functionality rather than indicative of a strict logical or physical structure or organization.

The invention can be implemented in any suitable form including hardware, software, firmware, or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as are suited to the particular use contemplated.

What is claimed is:

1. A computing device comprising:
   storage;
   at least one processor;
   logic stored on the storage, and implemented by the at least one processor, comprising:
      logic for presenting a web page, wherein the web page includes at least a story and at least one thumbnail image associated with the story, wherein at least one keyword is associated with the story and the at least one thumbnail image;
      logic for facilitating dragging the at least one thumbnail image to a search box on the web page, said dragging comprises displaying a copy of the at least one thumbnail image and the at least one keyword as a first visual indicator that is attached to the at least one thumbnail image and displayed together while in transit to the search box, the dragged and displayed copy of the at least one thumbnail image additionally displaying a second visual indicator indicating to a user search capabilities applicable to the at least one thumbnail image, the at least one keyword being displayed and attached to the associated at least one thumbnail image during said dragging, the at least one keyword describes the at least one thumbnail image and the at least one thumbnail image's association with the story, wherein the logic for dragging the at least one thumbnail image further comprises logic for visually highlighting the search box an assigned color only during said dragging and as a valid drop target of the any one or more of the at least one thumbnail image being dragged based in part upon position information within a browser window of the at least one thumbnail image being dragged, said highlighting the search box based upon an assigned indicator of the search box representative of said dragging the at least one thumbnail image identifying the search box as the valid drop target for the at least one thumbnail image;
      logic for facilitating releasing the at least one thumbnail image and the attached at least one keyword to the search box, said releasing causing the highlighting of the search box to be removed; and
      logic for populating the search box with the at least one keyword in response to dragging and releasing the at least one thumbnail image to the search box, said at least one keyword is formatted into a query search string and auto-populated in the search box, the at least one keyword is appended to any keywords already existing in the search box.

2. The computing device of claim 1, wherein the logic for presenting a web page comprises:
   logic for receiving data for building the web page in a rich site summary (RSS) data format; and logic for building the web page using the data received.

3. The computing device of claim 2, wherein the RSS data format comprises at least one keyword describing the story and a link to the source of the at least one thumbnail image.

4. The computing device of claim 3, wherein the RSS data format further includes at least an item selected from the group consisting of:
title, source, age, comments, description, and rating information about the story.

5. The computing device of claim 1 further comprising:
logic for editing the at least one keyword and any keywords already existing in the search box to form a new set of search queries.

6. The computing device of claim 1, further comprising:
logic for searching the Internet for information about the story using the at least one keyword and keywords already existing in the search box; and; and
logic for presenting search results on the web page.

7. A computing device comprising:
storage;
at least one processor;
logic stored on the storage, and implemented by the at least one processor, comprising:
logic for presenting a web page, wherein the web page includes at least a story and at least one thumbnail image associated with the story, wherein at least one keyword is associated with the story and the at least one thumbnail image;
logic for facilitating dragging the at least one thumbnail image to a search box on the web page, said dragging comprises displaying a copy of the at least one thumbnail image and the at least one keyword as a first visual indicator that is attached to the at least one thumbnail image and displayed together while in transit to the search box, the at least one keyword being displayed and attached to the associated at least one thumbnail image during said dragging, the at least one keyword describes the at least one thumbnail image and the at least one thumbnail image's association with the story, wherein the logic for dragging the at least one thumbnail image further comprises logic for visually highlighting the search box an assigned color only during said dragging and as a valid drop target of the any one or more of the at least one thumbnail image being dragged based in part upon position information within a browser window of the at least one thumbnail image being dragged, said highlighting the search box representative of said dragging the at least one thumbnail image identifying the search box as the valid drop target for the at least one thumbnail image;
logic for overlaying an icon on the any one or more of the at least one thumbnail image during dragging, said icon comprising as an additionally displayed second visual indicator for showing search capabilities applicable to the any one or more of the at least one thumbnail image;
logic for facilitating releasing the at least one thumbnail image and the attached at least one keyword to the search box, said releasing causing the highlighting of the search box to be removed; and
logic for populating the search box with the at least one keyword in response to dragging and releasing the at least one thumbnail image to the search box, said at least one keyword is formatted into a query search string and auto-populated in the search box, the at least one keyword is appended to any keywords already existing in the search box.

8. A computer-implemented method comprising:
presenting a web page to a user device, by a server computer, wherein the web page includes at least a story and at least one thumbnail image associated with the story; wherein at least one keyword is associated with the story and the at least one thumbnail image;
dragging the at least one thumbnail image to a search box on the web page, said dragging comprises displaying a copy of the at least one thumbnail image and the at least one keyword as a first visual indicator that is attached to the at least one thumbnail image and is displayed together while in transit to the search box, the at least one keyword being displayed and attached to the associated at least one thumbnail image during said dragging, the at least one keyword describes the at least one thumbnail image and the at least one thumbnail image's association with the story, said dragging comprising overlaying an icon on the at least one thumbnail image as an additional second visual indicator displaying to a user search capabilities applicable to the at least one thumbnail image during said dragging, wherein dragging the at least one thumbnail image further comprises visually highlighting the search box, by the server computer, an assigned color only during said dragging and as a valid drop target of the at least one thumbnail image being dragged based in part upon position information within a browser window of the at least one thumbnail image being dragged, said highlighting the search box based upon an assigned indicator of the search box representative of said dragging the at least one thumbnail image identifying the search box as the valid drop target for the at least one thumbnail image; and
populating a search box with the at least one keyword in response to dragging and releasing the at least one thumbnail image and the attached at least one keyword to the search box, said at least one keyword is formatted into a query search string and auto-populated in the search box, the at least one keyword is appended to any keywords already existing in the search box, said populating further comprising removing the highlighting of the search box upon said releasing.

9. The computer-implemented method of claim 8, wherein presenting a web page comprises:
receiving data, by a server computer, for building the web page in a rich site summary (RSS) data format; and
building the web page, by a server computer, using the data received.

10. The computer-implemented method of claim 9, wherein the RSS data format comprises at least one keyword describing the story and a link to the source of the at least one thumbnail image.

11. The computer-implemented method of claim 10, wherein the RSS data format further comprises at least an item selected from the group consisting of:
title, source, age, comments, description, and rating information about the story.

12. The computer-implemented method of claim 8 further comprising:
editing the at least one keyword and any keywords already existing in the search box, by a server computer, to form a new set of search queries.

13. The computer-implemented method of claim 8, further comprising:

searching the Internet for information about the story, by a server computer, using the at least one keyword and any keywords already existing in the search box; and presenting search results on the web page, by a server computer.

14. A non-transitory computer-readable storage medium tangibly encoded with a computer program product, that when executed by a processor of a computing device, performs a method comprising:

presenting a web page, wherein the web page includes at least a story and at least one thumbnail image associated with the story, wherein at least one keyword is associated with the story and the at least one thumbnail image;

dragging the at least one thumbnail image to a search box on the web page, said dragging comprises displaying a copy of the at least one thumbnail image and the at least one keyword as a first visual indicator that is attached to the at least one thumbnail image and displayed together while in transit to the search box, the at least one keyword being displayed and attached to the associated at least one thumbnail image during said dragging, the at least one keyword describes the at least one thumbnail image and the at least one thumbnail image's association with the story, said dragging comprising overlaying an icon as an additionally displayed second visual indicator on the copy of the at least one thumbnail image for displaying to a user search capabilities applicable to the at least one thumbnail image during said dragging, wherein said dragging the at least one thumbnail image further comprises code for visually highlighting the search box an associated color only during said dragging and as a valid drop target of the at least one thumbnail image being dragged based in part upon position information within a browser window of the at least one thumbnail image being dragged, said highlighting the search box based upon an assigned indicator of the search box representative of said dragging the at least one thumbnail image identifying the search box as the valid drop target for the at least one thumbnail image;

releasing the at least one thumbnail image and the attached at least one keyword to the search box, said releasing causing the highlighting of the search box to be removed; and populating the search box with the at least one keyword in response to dragging and releasing the at least one thumbnail image to the search box, said at least one keyword is formatted into a query search string and auto-populated in the search box, the at least one keyword is appended to any keywords already existing in the search box.

15. The non-transitory computer-readable storage medium of claim 14, wherein the code for presenting a web page comprises:

receiving data for building the web page in a rich site summary (RSS) data format; and building the web page using the data received.

16. The non-transitory computer-readable storage medium of claim 15, wherein the RSS data format comprises at least one keyword describing the story and a link to the source of the at least one thumbnail image.

17. The non-transitory computer-readable storage medium of claim 16, wherein the RSS data format further comprises at least an item selected from the group consisting of:

title, source, age, comments, description, and rating information about the story.

18. The non-transitory computer-readable storage medium of claim 14 further comprising:

editing the at least one keyword and any keywords already existing in the search box to form a new set of search queries.

19. The non-transitory computer-readable storage medium of claim 14, further comprising:

searching the Internet for information about the at least one thumbnail image using the at least one keyword and any keywords already existing in the search box; and presenting search results on the web page.

20. A non-transitory computer-readable storage medium tangibly encoded with a computer program product, that when executed by a processor of a computing device, performs a method comprising:

presenting a web page, wherein the web page includes at least a story and at least one thumbnail image associated with the story, wherein at least one keyword is associated with the story and the at least one thumbnail image;

dragging the at least one thumbnail image to a search box on the web page, said dragging comprises displaying a copy of the at least one thumbnail image and the at least one keyword as a first visual indicator that is attached to the at least one thumbnail image and displayed together while in transit to the search box, the at least one keyword being displayed and attached to the associated at least one thumbnail image during said dragging, the at least one keyword describes the at least one thumbnail image and the at least one thumbnail image's association with the story, said dragging comprising overlaying an icon as an additionally displayed second visual indicator on the copy of the at least one thumbnail image for displaying to a user search capabilities applicable to the at least one thumbnail image during said dragging, wherein-said dragging the at least one thumbnail image further comprises logic for visually highlighting the search box an assigned color only during said dragging as a valid drop target of the any one or more of the at least one thumbnail image being dragged based in part upon position information within a browser window of the at least one thumbnail image being dragged, said highlighting the search box based upon an assigned indicator of the search box representative of said dragging the at least one thumbnail image identifying the search box as the valid drop target for the at least one thumbnail image;

releasing the at least one thumbnail image and the attached at least one keyword to the search box, said releasing causing the highlighting of the search box to be removed;

overlaying an icon on the at least one thumbnail image as a visual indicator for showing search capabilities applicable to the at least one thumbnail image; and populating the search box with the at least one keyword in response to dragging and releasing the at least one thumbnail image to the search box, said at least one keyword is formatted into a query search string and auto-populated in the search box, the at least one keyword is appended to any keywords already existing in the search box.

* * * * *